(12) United States Patent
Lee et al.

(10) Patent No.: US 11,874,536 B2
(45) Date of Patent: Jan. 16, 2024

(54) POLARIZING PLATE AND OPTICAL DISPLAY DEVICE COMPRISING SAME

(71) Applicant: SAMSUNG SDI CO., LTD., Yongin-si (KR)

(72) Inventors: Jeong Ho Lee, Suwon-si (KR); Dong Ho Wee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 129 days.

(21) Appl. No.: 17/638,645

(22) PCT Filed: Aug. 27, 2020

(86) PCT No.: PCT/KR2020/011495
§ 371 (c)(1),
(2) Date: Feb. 25, 2022

(87) PCT Pub. No.: WO2021/040434
PCT Pub. Date: Mar. 4, 2021

(65) Prior Publication Data
US 2022/0299821 A1  Sep. 22, 2022

(30) Foreign Application Priority Data

Aug. 30, 2019 (KR) .................. 10-2019-0107627
Aug. 24, 2020 (KR) .................. 10-2020-0106611

(51) Int. Cl.
*G02F 1/1335* (2006.01)
*G02B 1/04* (2006.01)
*G02B 5/30* (2006.01)

(52) U.S. Cl.
CPC ......... *G02F 1/133528* (2013.01); *G02B 1/04* (2013.01); *G02B 5/305* (2013.01)

(58) Field of Classification Search
CPC ...... G02F 1/133528; G02B 1/04; G02B 5/305
See application file for complete search history.

(56) References Cited

U.S. PATENT DOCUMENTS 10,268,063 B2   4/2019  Ju et al.
2007/0031140 A1   2/2007  Biernath et al.
(Continued)

FOREIGN PATENT DOCUMENTS

CN    107121719 A    9/2017
JP    2010-524027 A   7/2010
(Continued)

OTHER PUBLICATIONS

International Search Report for corresponding Application No. PCT/KR2020/011495 dated Dec. 4, 2020, 5pp.

*Primary Examiner* — James A Dudek
(74) *Attorney, Agent, or Firm* — Lewis Roca Rothgerber Christie LLP (57) ABSTRACT

A polarizing plate and an optical display device comprising same are provided. The polarizing plate comprises: a polarizer; and a pattern layer disposed on the upper surface of the polarizer. The pattern layer includes a first resin layer, wherein the first resin layer has one or more intaglio patterns formed on the lower surface thereof. The intaglio pattern has side surfaces, and a first surface and a second surface having different base angles with respect to the maximum width of the intaglio pattern are continuously formed on the side surfaces. The first and second surfaces satisfy Equation 1, and when h1 is a height projected on the first surface and h2 is a height projected on the second surface, among the maximum heights of the intaglio pattern, h1 and h2 satisfy Equation 2.

21 Claims, 6 Drawing Sheets

(56) References Cited

U.S. PATENT DOCUMENTS

| | | | |
|---|---|---|---|
| 2010/0118239 A1 | 5/2010 | Roosendaal et al. | |
| 2013/0004728 A1* | 1/2013 | Boyd | F21V 11/00 359/485.01 |
| 2015/0002010 A1 | 1/2015 | Lee et al. | |

FOREIGN PATENT DOCUMENTS

| | | |
|---|---|---|
| KR | 10-2008-0042111 A | 5/2008 |
| KR | 10-2014-0108974 A | 9/2014 |
| KR | 10-2015-0025401 A | 3/2015 |
| KR | 10-2017-0122611 A | 11/2017 |
| TW | 201643483 A | 12/2016 |

\* cited by examiner

POLARIZING PLATE AND OPTICAL DISPLAY DEVICE COMPRISING SAME

CROSS-REFERENCE TO RELATED APPLICATIONS

This application is a U.S. National Phase Patent Application of International Application No. PCT/KR2020/011495, filed on Aug. 27, 2020, which claims priority to Korean Patent Application No. 10-2019-0107627, filed on Aug. 30, 2019, and Korean Patent Application No. 10-2020-0106611, filed on Aug. 24, 2020, the entire contents of all of which are incorporated herein by reference.

TECHNICAL FIELD

The present invention relates to a polarizing plate and an optical display apparatus including the same. More particularly, the present invention relates to a polarizing plate that can remarkably improve lateral contrast ratio, a ratio of lateral brightness to front brightness, and lateral viewing angle when applied to an optical display apparatus, and an optical display apparatus including the same.

BACKGROUND ART

A liquid crystal display includes a viewer side polarizing plate disposed on one surface of a liquid crystal panel and a light source side polarizing plate disposed on the other surface thereof. The viewer side polarizing plate is formed with a pattern layer having a predetermined pattern to improve lateral contrast ratio while broadening viewing angle.

In this regard, there is a method of providing a pattern having a trapezoidal, rectangular or square-shaped cross-sectional shape. However, this method has a limitation in improvement in contrast ratio, viewing angle and brightness ratio at a lateral side.

The background technique of the present invention is disclosed in Korean Patent Laid-open Publication No. 10-2014-0108974 and the like.

DISCLOSURE

Technical Problem

It is one aspect of the present invention to provide a polarizing plate that can remarkably improve lateral contrast ratio, a ratio of lateral brightness to front brightness, and lateral viewing angle.

It is another aspect of the present invention to provide a polarizing plate that can improve suppression of a Moiré phenomenon.

Technical Solution

One aspect of the present invention relates to a polarizing plate.

1. The polarizing plate includes: a polarizer; and a pattern layer disposed on an upper surface of the polarizer, wherein the pattern layer includes a first resin layer, the first resin layer being formed on a lower surface thereof with at least one engraved pattern having a lateral side, the lateral side having a first facet and a second facet consecutive to the first facet, the first facet and the second facet having different base angles with respect to a maximum width of the engraved pattern and satisfying Relations 1 and 2:

$$\theta_1 > \theta_2, \quad [\text{Relation 1}]$$

wherein Relation 1, $\theta_1$ denotes a base angle of the first facet, $\theta_2$ denotes a base angle of the second facet, about 70°≤$\theta_1$≤about 90°, about 0°<$\theta_2$<about 90°; and $$\text{about } 0.5 \leq h1/(h1+h2) < \text{about } 1.0, \quad [\text{Relation 2}]$$

wherein Relation 2, h1 denotes a projection height of the first facet projected on the maximum height of the engraved pattern and h2 denotes a projection height of the second facet projected on the maximum height of the engraved pattern.

2. In 1, the engraved pattern may have an aspect ratio of greater than about 1.0.

3. In 1 and 2, the engraved pattern may have a ($\theta_1$−$\theta_2$) value of greater than about 0° but not more than about 20°.

4. In 1 to 3, h1/(h1+h2) represented by Relation 2 may range from about 0.5 to about 0.9.

5. In 1 to 4, the engraved pattern may include a third facet formed at a top portion thereof and the lateral side connected to the third facet, and the third facet may be a flat surface.

6. In 5, the first facet may be closer to the separation surface or the third facet than the second facet.

7. In 1 to 6, the lateral surface may be free from facets having the same base angle.

8. In 1 to 7, each of the first facet and the second facet may be a flat surface or a curved surface.

9. In 1 to 8, a maximum width of a first region of the engraved pattern having the first facets at both lateral sides thereof may be about 1.1 times to about 3 times a maximum width of a second region of the engraved pattern having the second facets at both lateral sides thereof.

10. In 1 to 9, the engraved pattern may have a longitudinal direction tilted at an angle of about −20° to about +20° with respect to an absorption axis of the polarizer.

11. In 1 to 10, the pattern layer may further include a filling portion partially filling at least part of the engraved pattern or a second resin layer having the filling portion formed thereon.

12. In 11, the first resin layer may have a smaller index of refraction than the filling portion or the second resin layer.

13. In 11, the first resin layer may have a higher index of refraction than the filling portion or the second resin layer.

14. In 11, an absolute value of a difference in index of refraction between the second resin layer or the filling portion and the first resin layer may be about 0.3 or less.

15. In 11, the second resin layer may be an adhesive layer.

16. In 5, a minimum distance between the third face and an upper surface of the first resin layer may range from about 0 μm to about 10 μm.

17. In 1 to 16, the first resin layer may further include a separation surface between adjacent engraved patterns.

18. In 1 to 17, the polarizing plate may further include a protective layer formed on an upper surface of the first resin layer.

19. In 1 to 18, the engraved pattern may be composed of the first facet adjoining the separation surface on the lower surface of the first resin layer, the second facet consecutive to the first facet, and the third facet formed at the top portion thereof to be consecutive to the second facet.

20. In 1 to 19, the engraved pattern may be composed of the second facet adjoining the separation surface on the lower surface of the first resin layer, the first facet consecutive to the second facet, and the third facet formed at the top portion thereof to be consecutive to the first facet.

An optical display apparatus may include the polarizing plate according to the present invention.

Advantageous Effects

The present invention provides a polarizing plate that can remarkably improve a contrast ratio at a lateral side, a ratio of lateral brightness to front brightness, and lateral viewing angle.

The present invention provides a polarizing plate that can improve suppression of a Moiré phenomenon.

BEST MODE

Hereinafter, embodiments of the present invention will be described in detail with reference to the accompanying drawings. It should be understood that the present invention may be embodied in different ways and is not limited to the following embodiments. The following embodiments of the present invention will be described in detail with reference to the accompanying drawings to provide thorough understanding of the invention to those skilled in the art.

Although lengths, thicknesses or widths of various components may be exaggerated for understanding in the drawings, the present invention is not limited thereto. Like components will be denoted by like reference numerals throughout the specification.

Herein, spatially relative terms such as "upper" and "lower" are defined with reference to the accompanying drawings. Thus, it will be understood that the term "upper surface" can be used interchangeably with the term "lower surface", and when an element such as a layer or a film is referred to as being placed "on" another element, it can be directly placed on the other element, or intervening element(s) may be present. On the other hand, when an element is referred to as being placed "directly on" another element, there are no intervening element(s) therebetween.

Herein, the terms "horizontal direction" and "vertical direction" mean a longitudinal direction and a transverse direction of a rectangular screen of a liquid crystal display, respectively. In addition, on a screen of a liquid crystal display, "a "lateral" side refers to (0°, 30°) or (0°, 60°) in the spherical coordinate system represented by (φ, θ) in which a front side is indicated by (0°, 0°), a left end point is indicated by (180°, 90°), and a right end point is indicated by (0°, 90°) with reference to the horizontal direction.

Herein, "base angle" of a first facet of an engraved pattern means an angle defined between the first facet constituting a lateral side of the engraved pattern and the maximum width of the engraved pattern or a surface thereof parallel thereto.

Herein, "base angle" of a second facet of the engraved pattern means an angle defined between the second facet constituting the lateral side of the engraved pattern and the maximum width of the engraved pattern or the surface thereof parallel thereto.

Herein, "base angle" is defined as an angle of 90° or less.

Herein, "top portion" refers to the highest point of the engraved pattern.

Herein, "aspect ratio" refers to a ratio of the maximum height of a pattern to the maximum width thereof (maximum height/maximum width).

Herein, "pitch" means the sum of distances between adjacent engraved patterns, for example, the maximum width of one engraved pattern and the maximum width of a separation surface.

Herein, "in-plane retardation (Re)" is a value measured at a wavelength of 550 nm and is represented by Equation A:

$$Re=(nx-ny)\times d,$$ [Equation A]

wherein Equation A, nx and ny are the indexes of refraction in the slow and fast axes of a corresponding protective layer at a wavelength of 550 nm, respectively, and d is the thickness (unit: nm) of the protective layer.

Herein, the term "(meth)acryl" refers to acryl and/or methacryl.

As used herein to represent a specific numerical range, the expression "X to Y" means "X≤ and ≤Y".

A polarizing plate according to the present invention includes: a polarizer; and a pattern layer disposed on an upper surface of the polarizer, wherein the pattern layer includes a first resin layer, the first resin layer being formed on a lower surface thereof with at least one engraved pattern having a lateral side, the lateral side having a first facet and a second facet consecutive to the first facet, the first facet and the second facet having different base angles with respect to a maximum width of the engraved pattern or a plane parallel thereto and satisfying Relations 1 and 2:

$$\theta 1 > \theta 2,$$ [Relation 1]

wherein Relation 1, θ1 denotes a base angle of the first facet, θ2 denotes a base angle of the second facet, about 70°≤θ1≤about 90°, and about 0°<θ2<about 90°.

$$\text{about } 0.5 \leq h1/(h1+h2) < \text{about } 1.0$$ [Relation 2]

wherein Relation 2, h1 denotes a projection height of the first facet projected on the maximum height of the engraved pattern and h2 denotes a projection height of the second facet projected on the maximum height of the engraved pattern.

In the polarizing plate according to the present invention, the lateral side of the engraved pattern includes the first facet and the second facet consecutive to each other and having different base angles, unlike a typical engraved pattern having a completely flat or curved lateral side in the related art. In addition, among the first facet and the second facet of the polarizing plate according to the present invention, a facet having a larger base angle than the other facet has the same or greater projection height on the maximum height of the engraved pattern as or than the other facet having a smaller base angle. With this structure, the polarizing plate according to the present invention can remarkably improve viewing angle and contrast ratio at the lateral side thereof and a ratio of lateral brightness to front brightness on the screen of the liquid crystal display.

Preferably, among the first facet and the second facet, the projection height of the facet having a larger base angle than the other facet on the maximum height of the engraved pattern may be greater than that of the other facet having a smaller base angle. That is, the first facet and the second facet satisfy Relation 2: about 0.5<h1/(h1+h2)<about 1.0.

Hereinafter, a polarizing plate according to one embodiment of the present invention will be described with reference to FIG. 1.

Figure 1:
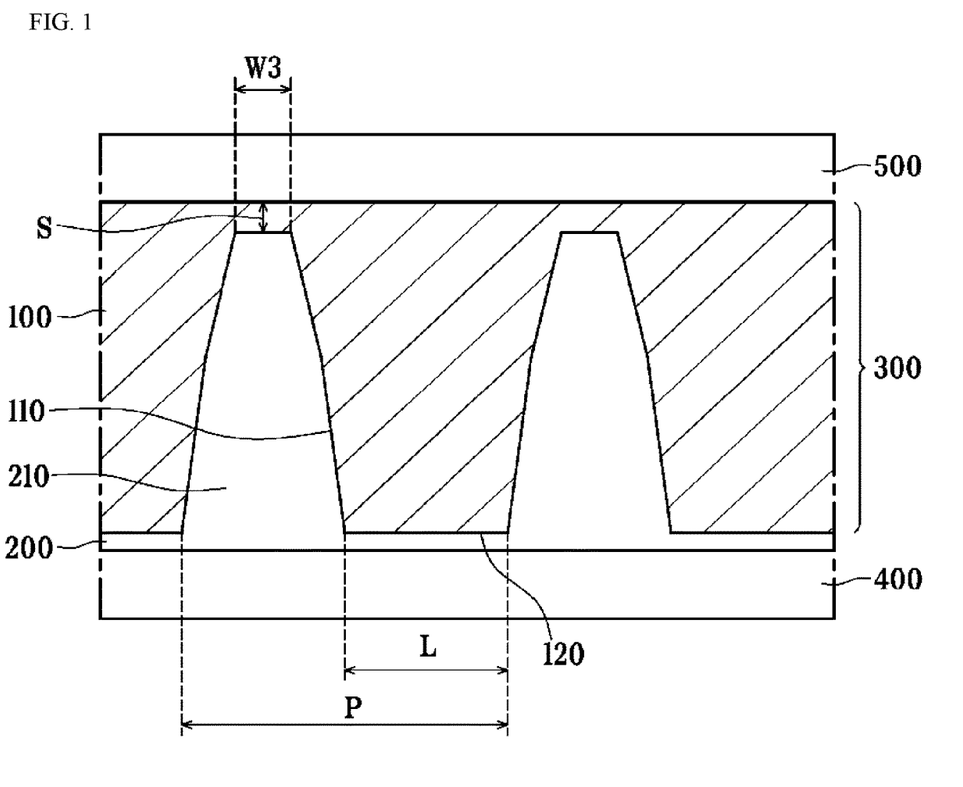
FIG. 1 is a sectional view of a polarizing plate according to one embodiment of the present invention.

Referring to FIG. 1, the polarizing plate includes a polarizer 400, a second resin layer 200, a first resin layer 100, and a protective layer 500.

In the polarizing plate, the second resin layer 200, the first resin layer 100, and the protective layer 500 are sequentially stacked on an upper surface of the polarizer 400. The first resin layer 100 and the second resin layer 200 constitute a pattern layer 300.

The upper surface of the polarizer 400 may be a light incidence surface or a light exit surface of the polarizer, preferably a light exit surface of the polarizer.

First Resin Layer

The first resin layer 100 is formed on the light exit surface of the polarizer 400 and allows light having passed through the polarizer to exit therethrough.

The first resin layer 100 is formed on a lower surface thereof with at least one engraved pattern 110 and a separation surface 120 disposed between adjacent engraved patterns. With the engraved pattern described below, the first resin layer 100 can remarkably improve viewing angle and contrast ratio on the screen of the liquid crystal display at a lateral side of the polarizing plate. The "engraved pattern" means a convex pattern formed on a lower surface of the pattern layer 300 and protruding towards the protective layer 500.

Figure 2:
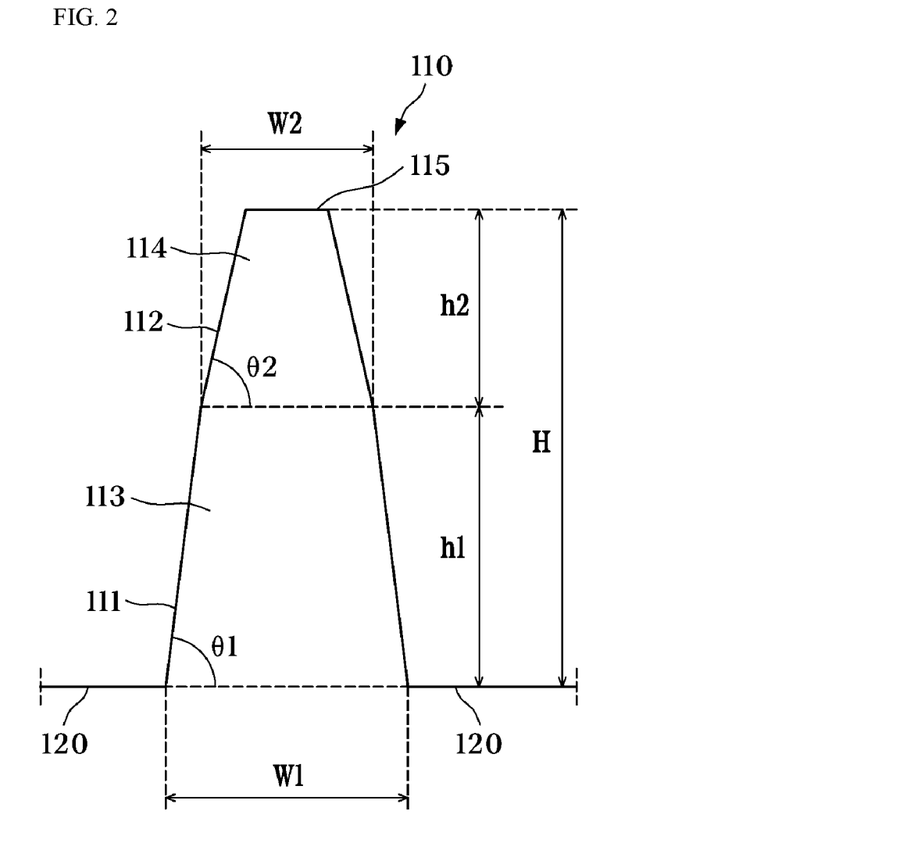
FIG. 2 is a sectional view of an engraved pattern of the polarizing plate shown in FIG. 1.

Referring to FIG. 2, the engraved pattern will be described in detail.

The engraved pattern 110 is constituted by a third facet 115 formed at a top portion thereof and a lateral side connected to the third facet 115. For convenience of description, a surface formed at the top portion of the engraved pattern 110 is referred to as the third facet. The "lateral side" means an entire surface portion of the engraved pattern disposed between the top portion, specifically the third facet, and the separation surface to connect the top portion to the separation surface.

The engraved pattern may have an aspect ratio of about 1.0 or more. Preferably, the engraved pattern has an aspect ratio of greater than about 1.0. Within this range, the engraved pattern can remarkably improve viewing angle and contrast ratio on the screen of the liquid crystal display at the lateral side of the polarizing plate. Preferably, the engraved pattern has an aspect ratio of about 1.5 or more, more preferably about 1.5 to about 3.0, about 2.0 to about 3.0, thereby remarkably improving viewing angle and contrast ratio at the lateral side of the polarizing plate. For example, the engraved pattern may have an aspect ratio of about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0.

Figure 4:
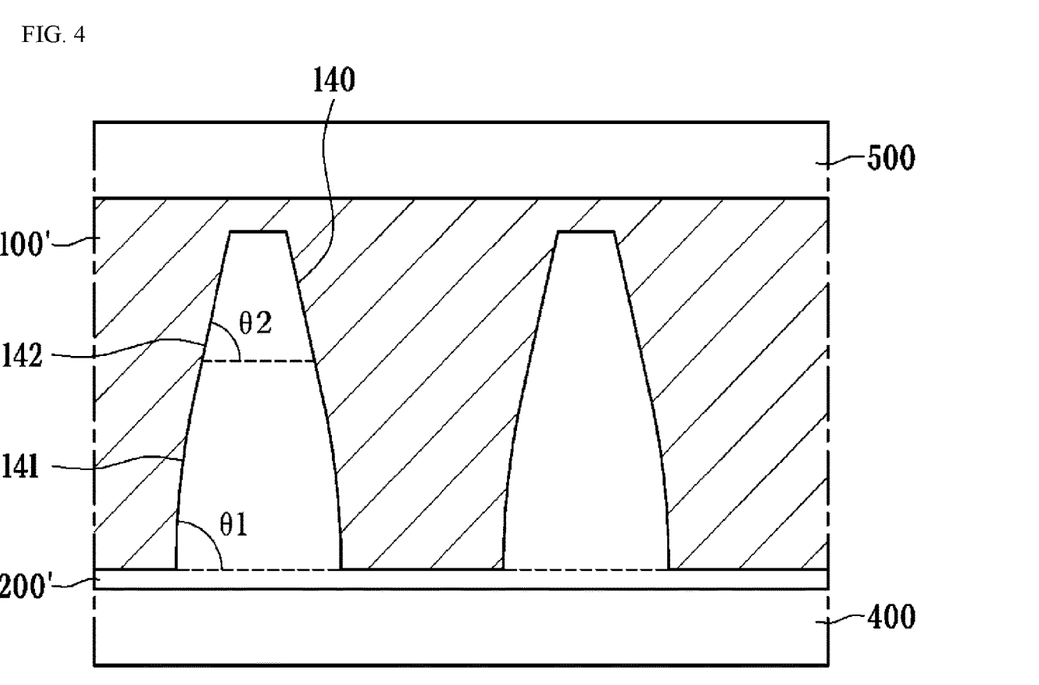
FIG. 4 is a sectional view of a polarizing plate according to a further embodiment of the present invention.
Figure 6:
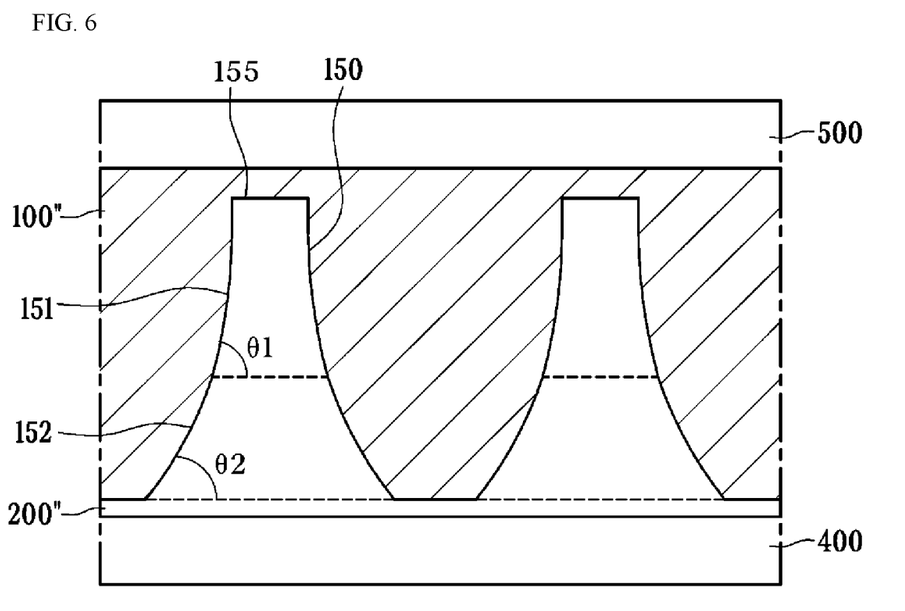
FIG. 6 is a sectional view of a polarizing plate according to yet another embodiment of the present invention.

The lateral side of the engraved pattern may include a first facet 111 and a second facet 112 consecutive to the first facet 111. Each of the first facet and the second facet may be a flat surface or a curved surface. FIG. 1 shows that both the first facet and the second facet are flat surfaces. The curved surface may be a convex surface as shown in FIG. 4 or a concave surface as shown in FIG. 6.

In one embodiment, the lateral side of the engraved pattern may consist of the first facet and the second facet. In this embodiment, the first facet 111 may be directly connected to the separation surface 120 and the second facet may 112 be directly connected to the third facet 115.

In another embodiment, the lateral side of the engraved pattern includes the first facet, the second facet, and a connecting facet, which connects the first facet or the second facet to the separation surface or the third facet. The connecting surface may be a curved surface or a flat surface, without being limited thereto. In one embodiment, the lateral side of the engraved pattern may be free from facets having the same base angle.

The first facet 111 and the second facet 112 have different base angles with respect to a maximum width W1 of the engraved pattern or a plane parallel thereto and satisfy Relations 1 and 2:

$$\theta 1 > \theta 2,$$ [Relation 1]

wherein Relation 1, θ1 denotes the base angle of the first facet, θ2 denotes the base angle of the second facet, about 70θ≤θ1≤about 90°, and about 0°<θ2<about 90°; and $$\text{about } 0.5 \leq h1/(h1+h2) < \text{about } 1.0,$$ [Relation 2]

wherein Relation 2, h1 denotes a projection height of the first facet 111 projected on the maximum height H of the engraved pattern 110 and h2 denotes a projection height of the second facet 112 projected on the maximum height H thereof.

Herein, "projection height" means a height corresponding to, for example, the height of the first facet 111 of FIG. 2 on the maximum height H of the engraved pattern.

The first facet and the second facet having different base angles are consecutively formed on the lateral side of the engraved pattern. When the base angle of the first facet is greater than the base angle of the second facet, the base angle θ1 of the first facet is in the range of about 70°≤θ1≤about 90° and the projection height of the first facet projected on the maximum height of the engraved pattern may be about 0.5 times to less than about 1.0 times the entire projection height (of the first facet and the second facet) on the maximum height of the engraved pattern, thereby remarkably improving viewing angle and contrast ratio at the lateral side of the engraved pattern.

As such, according to the present invention, instead of a first facet and a second facet having the same base angle and disposed parallel to each other to constitute one plane, the facets having different base angles are formed on the lateral side of the engraved pattern to affect a traveling direction of light emitted through the engraved pattern of the polarizer, and all of the base angles, the projection heights of the facets having different base angles, and the aspect ratio are controlled to achieve advantageous effects of the present invention.

Each of the first facet 111 and the second facet 112 may be a flat surface, which facilitates formation of the engraved pattern. However, at least one of the first facet and the second facet may be a curved surface or a flat surface having a curved surface formed on at least a portion thereof. This structure will be described in detail.

The first facet 111 may be closer to the separation surface 120 than the second facet 112.

The first facet 111 may have a base angle θ1 of about 70° to about 90°, more preferably about 75° to about 90°, or about 80° to about 85°. Within this range, the engraved pattern can assist in improvement in contrast ratio and viewing angle, and can be easily formed. For example, the first facet 111 may have a base angle θ1 of about 70°, 71°, 72°, 73°, 74°, 75°, 76°, 77°, 78°, 79°, 80°, 81°, 82°, 83°, 84°, 85°, 86°, 87°, 88°, 89°, or 90°.

The second facet 112 may have a base angle θ2 of greater than about 0° to less than about 90° (about 0°<θ2<about 90°), more preferably about 60° to about 80°, about 70° to about 80°, or about 70° to about 75°. Within this range, the engraved pattern can assist in improvement in contrast ratio and viewing angle, and can be easily formed. For example, the second facet 112 may have a base angle θ2 of about 0.01°, 0.1°, 0.5°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87°, 88°, 89°, 89.5°, 89.9°, or 89.99°.

In the engraved pattern, θ1-θ2 may be greater than about 0° but not more than about 20° (about 0°<θ1-θ2≤about 20°), specifically about 5° to about 15°. Within this range, the engraved pattern can improve contrast at the lateral side of the polarizing plate. For example, θ1-θ2 may be about 0.1°, 0.5°, 1°, 2°, 3°, 4°, 5°, 6°, 7°, 8°, 9°, 10°, 11°, 12°, 13°, 14°, 15°, 16°, 17°, 18°, 19°, or 20°.

In the engraved pattern, h1/(h1+h2) represented by Relation 2 may be in the range of about 0.5 to less than about 1.0, thereby assisting in improvement in contrast ratio and viewing angle on the screen of the liquid crystal display. Preferably, h1/(h1+h2) ranges from about 0.5 to about 0.9, about 0.6 to about 0.8, or about 0.7 to about 0.8, thereby enabling easy adjustment of the thickness of the pattern layer while improving suppression of the Moiré phenomenon.

For example, h1/(h1+h2) may be about 0.5, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, or 0.99.

In Relation 2, h1 may range from about 5 μm to about 20 μm, preferably from about 10 μm to about 20 μm, and h2 may range from about 1 μm to about 10 μm, preferably about 4 μm to about 8 μm. Within this range, the engraved pattern can satisfy Relation 2 and can be easily formed. For example, in Relation 2, h1 may be about 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, or 20 μm. For example, in Relation 2, h2 may be about 1 μm, 2 μm, 3 μm, 4 μm, 5 μm, 6 μm, 7 μm, 8 μm, 9 μm, or 10 μm.

The engraved pattern may have a maximum height H of about 5 μm to about 25 μm, preferably about 10 μm to about 20 μm. Within this range, the engraved pattern can easily achieve the aspect ratio according to the present invention and can easily satisfy Relation 2. For example, the engraved pattern may have a maximum height H of about 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, or 25 μm.

The ratio ((h1+h2)/H) of (h1+h2) to the maximum height (H) of the engraved pattern may range from about 0.5 to about 1.0, preferably about 0.6 to about 1.0, more preferably about 0.9 to about 1.0. Within this range, the polarizing plate can achieve reduction in thickness of the pattern layer while improving contrast ratio and viewing angle thereof. For example, ((h1+h2)/H) may be about 0.5, 0.6, 0.7, 0.8, 0.9, or 1.0.

The engraved pattern may have a maximum width W1 of about 5 μm to about 20 μm, preferably about 8 μm to about 15 μm. Within this range, the engraved pattern can easily achieve the aspect ratio according to the present invention. For example, the engraved pattern may have a maximum width W1 of about 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, or 20 μm.

The engraved pattern may have a bisymmetrical structure, without being limited thereto, and both the first facet and the second facet may be formed on each of both lateral sides of the engraved pattern.

The engraved pattern may include a first region 113 and a second region 114 adjoining each other on each of both lateral sides thereof, in which the first region 113 includes the first facet and the second region 114 includes the second facet.

The first region 113 may have the same maximum width as the maximum width W1 of the engraved pattern 110 and the second region 114 may have a maximum width W2 of about 3 μm to about 15 μm, preferably about 4 μm to about 15 μm. Within this range, the engraved pattern can easily achieve the aspect ratio according to the present invention. For example, the second region 114 may have a maximum width W2 of about 3 μm, 4 μm, 5 μm, 6 μm, 7 μm, 8 μm, 9 μm, 10 μm, 11 μm, 12 μm, 13 μm, 14 μm, or 15 km.

A ratio (h1/W1) of the projection height h1 to the maximum width W1 of the first region 113, that is, the aspect ratio of the first region 113, may range from about 1 to about 3, specifically about 1.1 to about 3, about 1.1 to about 2, and a ratio (h2/W2) of the projection height h2 to the maximum width W2 of the second region 114, that is, the aspect ratio of the second region 114, may range from about 0.1 to about 1, specifically about 0.3 to about 1, more specifically about 0.3 to about 0.9. Within this range, the engraved pattern can improve contrast of the polarizing plate at the lateral sides thereof.

For example, the ratio (h1/W1) may be about 1.0, 1.1, 1.2, 1.3, 1.4, 1.5, 1.6, 1.7, 1.8, 1.9, 2.0, 2.1, 2.2, 2.3, 2.4, 2.5, 2.6, 2.8, 2.8, 2.9, or 3.0. For example, the ratio (h2/W2) may be about 0.1, 0.2, 0.3, 0.4, 0.5, 0.6, 0.7, 0.8, 0.9, or 1.0.

The maximum width W1 of the first region 113 may be about 1.1 times to about 3 times, specifically about 1.3 times to about 3 times, the maximum width W2 of the second region 114. Within this range, the engraved pattern can further improve contrast ratio on the screen of the liquid crystal display at the lateral sides thereof. For example, the maximum width W1 of the first region 113 may be about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or 3.0 times the maximum width W2 of the second region 114.

The third facet 115 formed at the top portion of the engraved pattern allows a vertical component of light having passed through the polarizer to pass therethrough, thereby improving front contrast ratio and brightness. The third facet may be parallel to the maximum width of the engraved pattern or the separation surface and may be a flat surface. Alternatively, the third facet may have roughness formed on a surface thereof.

The third facet 115 may have a width W3 of greater than about 0 μm but not more than about 10 μm (about 0 μm<W3≤about 10 μm), preferably about 2 μm to about 8 μm. Within this range, the third facet can improve front contrast and brightness of the polarizing plate. For example, the third facet 115 may have a width W3 of about 0.1 μm, 0.5 μm, 1 μm, 2 μm, 3 μm, 4 μm, 5 μm, 6 μm, 7 μm, 8 μm, 9 μm, or 10 μm.

The engraved pattern may be constituted by the third facet, the first facet and the second facet to have a bisymmetrically hexagonal cross-sectional shape. However, it should be understood that the engraved pattern may have any cross-sectional shape so long as the engraved pattern includes the first facet and the second facet. For example, the engraved pattern may have an N-gonal shape (N being an integer of 6 to 20), such as an octagonal shape, a decagonal shape, and the like.

In one embodiment, the engraved pattern is constituted by the first facet 111 adjoining the separation surface 120 on the lower surface of the first resin layer, the second facet 112 consecutive to the first facet 111, and the third facet 115 formed at the top portion thereof to be consecutive to the second facet 112.

Referring again to FIG. 1, the first resin layer may include one or more engraved patterns formed on the lower surface thereof. The engraved patterns may have the same or different base angles, maximum heights, shapes, and the like.

Although not shown in FIG. 1, the engraved patterns may have a stripe shape extending in a longitudinal direction thereof. Herein, the "longitudinal direction of the engraved pattern" means a perpendicular direction with respect to the maximum width direction of the engraved pattern. However, the engraved patterns may be arranged in a dot shape. The "dot" shape means that the engraved patterns are dispersed.

The longitudinal direction of the engraved pattern 110 may be tilted at an angle of about −20° to about +20°, for example, at an angle of about −5° to about +5°, or at an angle of about 0°, with respect to an absorption axis (0°) of the polarizer 400 (the machine direction (MD) of the polarizer). Within this range, the engraved pattern 110 can improve suppression of the Moiré phenomenon. For example, the longitudinal direction of the engraved pattern 110 may be tilted at an angle of about −20°, −19°, −18°, −17°, −16°, −15°, −14°, −13°, −12°, −11°, −10°, −9°, −8°, −7°, −6°, −5°, 4°, −3°, −2°, 0°, +1°, +2°, +3°, +4°, +5°, +6°, +7°, +8°, +9°, +10°, +11°, +12°, +13°, +14°, +15°, +16°, +17°, +18°, +19°, or +20° with respect to the absorption axis (0°) of the polarizer.

The first resin layer 100 includes the separation surface 120. The separation surface 120 serves to spread light reaching the separation surface while maintaining front contrast and brightness. The separation surface may be a flat surface, a curved surface, or a roughened surface. Preferably, the separation surface is a flat surface to allow easy formation of the pattern.

The separation surface 120 may have a width L of about 1 μm to about 300 μm, specifically about 3 μm to about 50 μm. Within this range, the separation surface can improve front brightness.

A ratio of the maximum width W1 of the engraved pattern 110 to the width L of the separation surface 120 may be about 9 or less, preferably about 0.1 to about 5, more preferably about 0.1 to about 3. Within this range, the engraved pattern can improve front brightness while reducing the difference between front contrast ratio and lateral contrast ratio. For example, the ratio of the maximum width W1 of the engraved pattern to the width L of the separation surface may be about 0.1, 0.5, 1, 1.5, 2, 2.5, 3, 3.5, 4, 4.5, 5, 5.5, 6, 6.5, 7, 7.5, 8, 8.5, or 9.

The first resin layer 100 may have a pitch P of about 5 μm to about 500 μm, specifically about 10 μm to about 50 μm. Within this range, the first resin layer can improve brightness and contrast of the polarizing plate while improving suppression of the Moiré phenomenon.

The first resin layer 100 has a higher index of refraction than the second resin layer 200. With this structure, the polarizing plate according to the present invention can have various effects. A difference in index of refraction between the second resin layer and the first resin layer may be about 0.3 or less, specifically about 0.2 or less, preferably greater than about 0 but not more than about 0.2, more preferably about 0.05 to about 0.2. Within this range, the polarizing plate can achieve improvement in contrast and viewing angle. For example, a difference in index of refraction therebetween may be about 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, or 0.3.

The first resin layer 100 may have an index of refraction of about 1.55 or more, specifically about 1.58 to about 1.70, more specifically about 1.60 to about 1.68. Within this range, the polarizing plate according to the present invention can have various effects. For example, the first resin layer 100 may have an index of refraction of about 1.55, 1.56, 1.57, 1.58, 1.59, 1.60, 1.61, 1.62, 1.63, 1.64, 1.65, 1.66, 1.67, 1.68, 1.69, or 1.70.

The first resin layer 100 may be formed of a composition including at least one of a UV curable resin and a heat curable resin, which can secure the aforementioned index of refraction and transparency. For example, the resin may include at least one selected from the group consisting of (meth)acrylic, polycarbonate, silicone, and epoxy resins, without being limited thereto. The first resin layer may further include a photo-initiator, a heat initiator, or various additives.

Second Resin Layer

The second resin layer 200 is formed on the lower surface of the first resin layer 100 to constitute the pattern layer 300. The second resin layer 200 is formed on the light exit surface of the polarizer and serves to spread light through refraction of light having passed through the polarizer in various directions depending upon a light incident location thereof.

The second resin layer 200 is formed with a filling portion 210, which fills at least part of the engraved pattern. Herein, "fills at least part of the engraved pattern" includes completely or partially filling the engraved pattern. In the structure wherein the engraved pattern is partially filled therewith, the remaining part of the engraved pattern may be filled with air.

The second resin layer 200 may directly contact the engraved pattern 111 and the separation surface 120. The second resin layer may be formed between the separation surface and the polarizer to promote uniform spreading of light by allowing light having passed through the polarizer to pass therethrough instead of directly passing through the first resin layer.

According to other embodiments, the second resin layer may be constituted only by the filling portion, which fills at least part of the engraved pattern.

The second resin layer 200 may have an index of refraction of about 1.55 or less, specifically about 1.4 to about 1.55, more specifically about 1.42 to about 1.52. Within this range, the second resin layer can secure a good light spreading effect while improving the contrast ratio. For example, the second resin layer 200 may have an index of refraction of about 1.4, 1.41, 1.42, 1.43, 1.44, 1.45, 1.46, 1.47, 1.48, 1.49, 1.5, 1.51, 1.52, 1.53, 1.54, or 1.55.

The second resin layer may be formed of a composition including at least one of a UV curable resin and a heat curable resin, which can secure the aforementioned index of refraction and transparency. For example, the resin may include at least one selected from the group consisting of (meth)acrylic, polycarbonate, silicone, and epoxy resins, without being limited thereto. The second resin layer may further include a photo-initiator, a heat initiator, or various additives.

In one embodiment, the second resin layer may be a non-adhesive layer.

In another embodiment, the second resin layer may be an adhesive layer and may be directly stacked on an adherend, such as the polarizer, thereby enabling reduction in thickness of the polarizing plate.

Pattern Layer

The entirety of the first resin layer 100 and the second resin layer 200 forms the pattern layer 300.

In the pattern layer 300, a minimum distance between the third facet 115 of the engraved pattern 110 and an uppermost surface of the pattern layer 300 or a minimum distance S between the third facet and an upper surface of the first resin layer may range from about 0 μm to about 10 μm, specifically greater than about 0 μm to but not more than about m, more specifically from about 1 μm to about 5 μm. Within this range, the pattern layer 300 can improve suppression of the Moiré phenomenon. For example, the minimum distance therebetween may be about 0 μm, 1 μm, 2 μm, 3 μm, 4 μm, 5 μm, 6 μm, 7 μm, 8 μm, 9 μm, or 10 μm.

The pattern layer 300 may have a thickness of about 10 μm to about 50 μm, specifically about 20 μm to about 40 μm. Within this range, the pattern layer 300 can improve suppression of the Moiré phenomenon.

Protective Layer

The protective layer 500 may be formed on the first resin layer 100 to support the first resin layer and the second resin layer. The protective layer is a light transmitting layer and allows light emitted from an optical display apparatus and having spread through the first resin layer and the second resin layer to pass therethrough. The protective layer 500 may be directly formed on the first resin layer 100.

The protective layer 500 may be integrally formed with the first resin layer 100. Herein, "integrally" means that the protective layer is not independently separated from the first resin layer.

The protective layer may be a retardation film or an isotropic optical film having a predetermined range of retardation. In one embodiment, the protective layer may have an Re of about 6,000 nm or more, about 8,000 nm or more, specifically about 10,000 nm or more, more specifically greater than about 10,000 nm, more specifically about 10,100 nm to about 15,000 nm. Within this range, the protective layer can prevent a rainbow spot from being visible and can promotes diffusion of light spreading through the first resin layer. In another embodiment, the protective layer may be an isotropic optical film having an Re of about 60 nm or less, specifically about 0 nm to about 60 nm, more specifically about 40 nm to about 60 nm. Within this range, the protective layer can compensate for viewing angle to improve image quality. The "isotropic optical film" means an optical film having substantially the same nx, ny and nz values. Here, the expression "substantially the same" includes not only the case where nx, ny and nz are completely the same, but also the case where there is an acceptable tolerance.

The protective layer 500 may have a thickness of about 30 μm to about 120 μm, specifically about 55 μm to about 105 μm. Within this range, the protective layer can be used in an optical display apparatus. The protective layer may have a light transmittance of about 80% or more, specifically about 85% to about 95%, in the visible spectrum. The protective layer may include a film formed by uniaxially or biaxially stretching an optically transparent resin. Specifically, the resin may include at least one selected from among polyester resins including polyethylene terephthalate (PET), polybutylene terephthalate, polyethylene naphthalate, polybutylene naphthalate, and the like; acryl resins; cyclic olefin polymer (COP) resins; cellulose ester resins including triacetylcellulose (TAC); polyvinyl acetate; polyvinyl chloride (PVC); polynorbornene, polycarbonate (PC), polyamide, polyacetal, polyphenylene ether, polyphenylene sulfide, polysulfone, polyether sulfone, polyarylate, and polyimide resins. The protective layer may include a film manufactured after modification of the resin. Modification may include copolymerization, branching, crosslinking, or modification of a terminal molecule.

Although not shown in FIG. 1, a functional layer may be formed on the other surface of the protective layer. The functional layer may be a separate layer independent of the protective layer or may be integrally formed with the protective layer. The functional layer may provide at least one function among anti-reflection, low reflection, hard coating, anti-glare, anti-fingerprint, anti-contamination, diffusion, and refraction functions.

Polarizer

The polarizer 400 serves to polarize incident light and may include a typical polarizer known to those skilled in the art. Specifically, the polarizer may include a polyvinyl alcohol-based polarizer formed by uniaxially stretching a polyvinyl alcohol film or a polyene-based polarizer formed through dehydration of the polyvinyl alcohol film. The polarizer may have a thickness of about 5 μm to about 40 μm. Within this range, the polarizer can be used in an optical display apparatus.

Although not shown in FIG. 1, the aforementioned protective layer may be further formed on an upper or lower surface of the polarizer.

Next, a polarizing plate according to another embodiment will be described with reference to FIG. 3.

Figure 3:
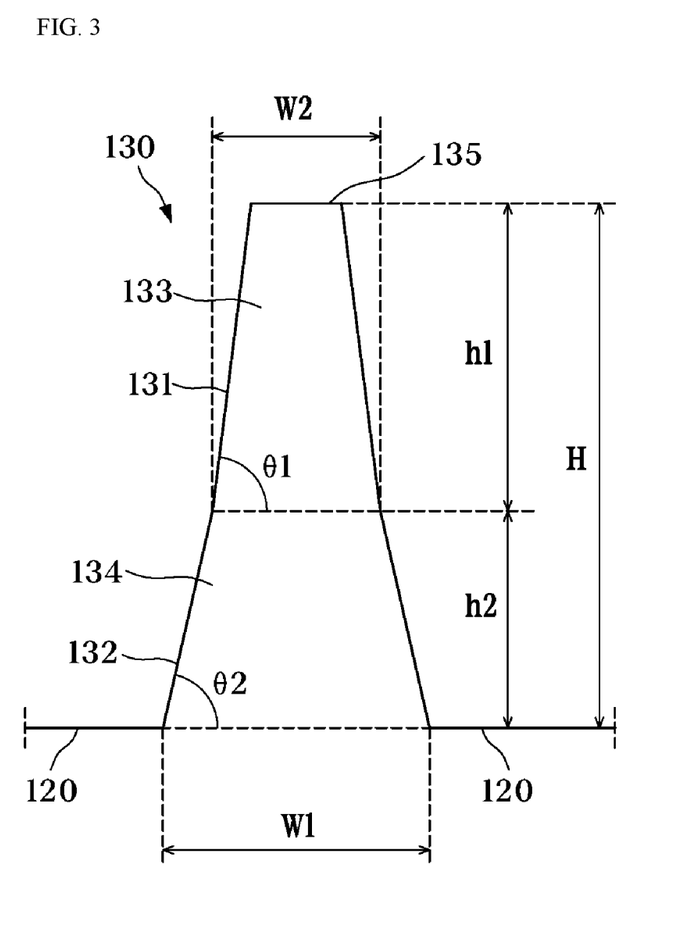
FIG. 3 is a sectional view of an engraved pattern of a polarizing plate according to another embodiment of the present invention.

Referring to FIG. 3, the polarizing plate according to this embodiment is substantially the same as the polarizing plate shown in FIG. 1 except for an engraved pattern 130 as shown in FIG. 3, instead of the engraved pattern shown in FIG. 2.

Referring to FIG. 3, the engraved pattern 130 is constituted by a third facet 135 formed at a top portion thereof and a lateral side connected to the third facet 135.

The engraved pattern 130 may have an aspect ratio of about 1.0 or more, specifically greater than about 1.0. Within this range, the engraved pattern can assist in improving viewing angle and contrast ratio at the lateral side of the polarizing plate. Preferably, the engraved pattern has an aspect ratio of about 1.5 or more, more preferably about 1.5 to about 3.0, still more preferably about 2.0 to about 3.0 to achieve remarkable improvement in lateral contrast and viewing angle while further improving visibility at the lateral side.

For Example, the engraved pattern 130 may have an aspect ratio of about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or 3.0.

The engraved pattern 130 includes the lateral side on which a first facet 131 and a second facet 132 consecutive to the first facet 131 are formed. The first facet 131 is closer to the third facet 135 than the second facet 132.

The first facet 131 and the second facet 132 have different base angles with respect to the maximum width W1 of the engraved pattern or the plane parallel thereto and satisfy Relations 1 and 2:

$$\theta_1 > \theta_2,$$  [Relation 1]

wherein Relation 1, θ1 denotes the base angle of the first facet, θ2 denotes the base angle of the second facet, about 70°≤θ1≤about 90°, and about 0°<θ2<about 90°; and about 0.5≤$h1/(h1+h2)$<about 1.0,   [Relation 2]

wherein Relation 2, h1 denotes a projection height of the first facet 131 projected on the maximum height H of the engraved pattern 130 and h2 denotes a projection height of the second facet 132 projected on the maximum height H thereof.

The first facet 131 and the second facet 132 having different base angles are consecutively formed on the lateral side of the engraved pattern 130. When the base angle of the first facet is greater than the base angle of the second facet, the base angle θ1 of the first facet is in the range of about 70°≤θ1≤about 90° and the projection height of the first facet projected on the maximum height of the engraved pattern may be about 0.5 times to less than about 1.0 times the entire projection height (of the first facet and the second facet) on the maximum height of the engraved pattern, thereby remarkably improving viewing angle and contrast ratio on the lateral side of the engraved pattern. As such, according to the present invention, instead of a first facet and a second facet having the same base angle and disposed parallel to each other, the facets having different base angles are formed on the engraved pattern to affect a traveling direction of light emitted through the engraved pattern of the polarizer, and all of the base angles, the projection heights of the facets having different base angles, and the aspect ratio are controlled to achieve advantageous effects of the present invention.

Each of the first facet 131 and the second facet 132 may be a flat surface, which facilitates formation of the engraved pattern. However, at least one of the first facet and the second facet may be a curved surface or a flat surface having a curved surface formed on at least a portion thereof.

The first facet 131 may have a base angle θ1 of about 70θ to about 90°, more preferably about 750 to about 90°, about 850 to about 90°, or about 80° to about 85°. Within this range, the engraved pattern can assist in improvement in contrast ratio and viewing angle, and can be easily formed. For example, the first facet 131 may have a base angle θ1 of about 70°, 71°, 72°, 73°, 74°, 75°, 76°, 77°, 78°, 79°, 80°, 81°, 82°, 83°, 84°, 85°, 86°, 87°, 88°, 89°, or 90°.

The second facet 132 may have a base angle θ2 of greater than about 0° to less than about 90° (about 0°<θ2<about 90°), more preferably about 60° to about 80°, about 70° to about 80°, or about 70° to about 75°. Within this range, the engraved pattern can assist in improvement in contrast ratio and viewing angle, and can be easily formed. For example, the second facet 132 may have a base angle θ2 of about 0.01°, 0.1°, 0.5°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87°, 88°, 89°, 89.5°, 89.9°, or 89.99°.

In the engraved pattern, θ1-θ2 may be greater than about 0° but not more than about 20°, specifically about 5° to about 15°. Within this range, the engraved pattern can improve the lateral contrast ratio. θ1-θ2 may be about 0.01°, 0.1°, 0.5°, 1°, 2°, 3°, 4°, 5°, 6°, 7°, 8°, 9°, 10°, 11°, 12°, 13°, 14°, 15°, 16°, 17°, 18°, 19°, or 20°.

In the engraved pattern 130, h1/(h1+h2) represented by Relation 2 may be in the range of about 0.5 to less than about 1.0, thereby assisting in improvement in contrast ratio and viewing angle. Preferably, h1/(h1+h2) ranges from about 0.5 to about 0.9, about 0.5 to about 0.8, or about 0.5 to about 0.7, thereby enabling easy adjustment of the thickness of the pattern layer while improving suppression of the Moiré phenomenon. For example, h1/(h1+h2) may be about 0.5, 0.6, 0.7, 0.8, 0.9, or 0.99.

In Relation 2, h1 may range from about 5 μm to about 20 μm, preferably from about 10 μm to about 20 μm, and h2 may range from about 1 μm to about 10 μm, preferably about 4 μm to about 8 μm. Within this range, the engraved pattern can satisfy Relation 2 and can be easily formed. For example, in Relation 2, h1 may be about 5 μm, 6 μm, 7 μm, 8 μm, 9 μm, m, 11 μm, 12 μm, 13 μm, 14 μm, 15 μm, 16 μm, 17 μm, 18 μm, 19 μm, or 20 μm, and h2 may be 1 μm, 2 μm, 3 μm, 4 μm, 5 μm, 6 μm, 7 μm, 8 μm, 9 μm, or 10 μm.

The engraved pattern 130 may have a maximum height H of about 5 μm to about 25 μm, preferably about 10 μm to about 20 μm. Within this range, the engraved pattern can easily achieve the aspect ratio according to the present invention and can easily satisfy Relation 2.

The ratio of (h1+h2) to the maximum height (H) of the engraved pattern 130 ((h1+h2)/H) may range from about 0.5 to about 1.0, preferably about 0.6 to about 1.0, more preferably about 0.9 to about 1.0. Within this range, it is possible to achieve reduction in thickness of the pattern layer while improving contrast ratio and viewing angle. For example, ((h1+h2)/H) may be about 0.5, 0.6, 0.7, 0.8, 0.9, or 1.0.

The engraved pattern 130 may have a maximum width W1 of about 5 μm to about 20 μm, preferably about 8 μm to about 15 μm. Within this range, the engraved pattern can easily achieve the aspect ratio according to the present invention. For example, the engraved pattern 130 may have a maximum width W1 of about 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, or 20 μm.

The engraved pattern 130 may have a bisymmetrical structure, without being limited thereto, and both the first facet and the second facet may be formed on each of both lateral sides of the engraved pattern. The engraved pattern may include a first region 133 and a second region 134 adjoining each other on each of both lateral sides thereof, in which the first region 133 includes the first facet 131 and the second region 134 includes the second facet 132.

The second region 134 may have the same maximum width as the maximum width W1 of the engraved pattern described above. The first region 133 may have a maximum width W2 of about 3 μm to about 15 μm, preferably about 8 μm to about 15 μm. Within this range, the engraved pattern can easily achieve the aspect ratio according to the present invention. For example, the first region may have a maximum width W2 of about 3 μm, 4 μm, 5 μm, 6 μm, 7 μm, 8 μm, 9 μm, 10 μm, 11 μm, 12 μm, 13 μm, 14 μm, or 15 μm.

A ratio (h1/W1) of the projection height h1 to the maximum width W2 of the first region 133, that is, the aspect ratio of the first region 133, may range from about 1 to about 3, specifically about 1.1 to about 3. Within this range, the engraved pattern can improve contrast of the polarizing plate at the lateral sides thereof. For example, the ratio (h1/W1) may be about 1.0, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, or 3.

A ratio (h2/W2) of the projection height h2 to the maximum width W1 of the second region 134, that is, the aspect ratio of the second region 134, may range from about 0.1 to about 1, specifically about 0.3 to about 1, more specifically about 0.3 to about 0.9. For example, the ratio (h2/W2) of the projection height h2 to the maximum width W1 in the second region may be about 0.1, 0.2, 0.3, 0.4, 0.5, 0.6, 0.7, 0.8, 0.9, or 1.0.

The maximum width of the second region 134 may be about 1.1 times to about 3 times, specifically about 1.3 times to about 3 times, the maximum width of the first region 133 of the engraved pattern. Within this range, the engraved pattern can further improve lateral contrast ratio on the screen of the liquid crystal display.

The third facet 135 formed at the top portion of the engraved pattern allows a vertical component of light having passed through the polarizer to pass therethrough, thereby improving front contrast ratio and brightness. The third facet 135 may be parallel to the maximum width of the engraved pattern or the separation surface and may be a flat surface. Alternatively, the third facet 135 may have roughness formed on a surface thereof. The third facet may have a width of about 1 μm to about 10 μm, preferably about 3 μm to about 6 μm. For example, the third facet 135 may have a width W3 of about 1 μm, 2 μm, 3 μm, 4 μm, 5 m, 6 μm, 7 μm, 8 μm, 9 μm, or 10 μm.

The longitudinal direction of the engraved pattern may be tilted at an angle of about −20° to about +20°, for example, at an angle of about −5° to about +5°, or at about 0° with respect to an absorption axis (0°) (the MD (machine direction) of the polarizer). Within this range, the engraved pattern 110 can achieve suppression of the Moiré phenomenon. For example, the longitudinal direction of the engraved pattern may be tilted at an angle of about −20°, −19°, −18°, −17°, −16°, −15°, −14°, −13°, −12°, −11°, −10°, −8, −7°, −6°, −5°−4°, −3°, −2°, 1, 0°, +1°, +2°, +3°, +4°, +5°, +6°, +7°, +8°, +9°, +10°, +11°, +12°, +13°, +14°, +15°, +16°, +17°, +18°, +19°, or +20° with respect to an absorption axis (0°).

The first resin layer includes the separation surface 120. The separation surface 120 serves to spread light reaching the separation surface while maintaining front contrast and brightness. The separation surface may be a flat surface, a curved surface, or a roughened surface. Preferably, the separation surface is a flat surface to allow easy formation of the pattern.

The separation surface 120 may have a width L of about 1 μm to about 300 μm, specifically about 3 μm to about 50 μm. Within this range, the separation surface can improve front brightness.

A ratio of the maximum width W1 of the engraved pattern to width of the separation surface 120 may be about 9 or less, preferably about 0.1 to about 5, more preferably about 0.1 to about 3. Within this range, the engraved pattern can improve front brightness while reducing the difference between front contrast ratio and lateral contrast ratio. For example, the ratio of the maximum width of the engraved pattern to the width of the separation surface may be about 0.1, 0.5, 1, 1.5, 2, 2.5, 3, 3.5, 4, 4.5, 5, 5.5, 6, 6.5, 7, 7.5, 8, 8.5, or 9.

The first resin layer 100 may have a pitch P of about 5 μm to about 500 μm, specifically about 10 μm to about 50 μm. Within this range, the first resin layer can improve brightness and contrast of the polarizing plate while improving suppression of the Moiré phenomenon.

In one embodiment, the engraved pattern is constituted by the second facet 132 adjoining the separation surface 120 on the lower surface of the first resin layer, the first facet 131 consecutive to the second facet 132, and the third facet 135 formed at the top portion thereof to be consecutive to the first facet 131.

Next, a polarizing plate according to a further embodiment will be described with reference to FIG. 4.

Referring to FIG. 4, the polarizing plate according to this embodiment includes a polarizer 400, a first resin layer 100' having an engraved pattern 140 thereon, a second resin layer 200', and a protective layer 500. The polarizing plate according to this embodiment is substantially the same as the polarizing plate shown in FIG. 1 except for the engraved pattern 140.

The engraved pattern 140 according to this embodiment is substantially the same as the engraved pattern 110 shown in FIG. 1 except that the engraved pattern 140 according to this embodiment includes a first facet 141 and a second facet 142 having different base angles θ1, θ2 with respect to the maximum width thereof and consecutive to each other, in which the first facet 141 is a curved surface and the second facet 142 is a flat surface.

Figure 5:
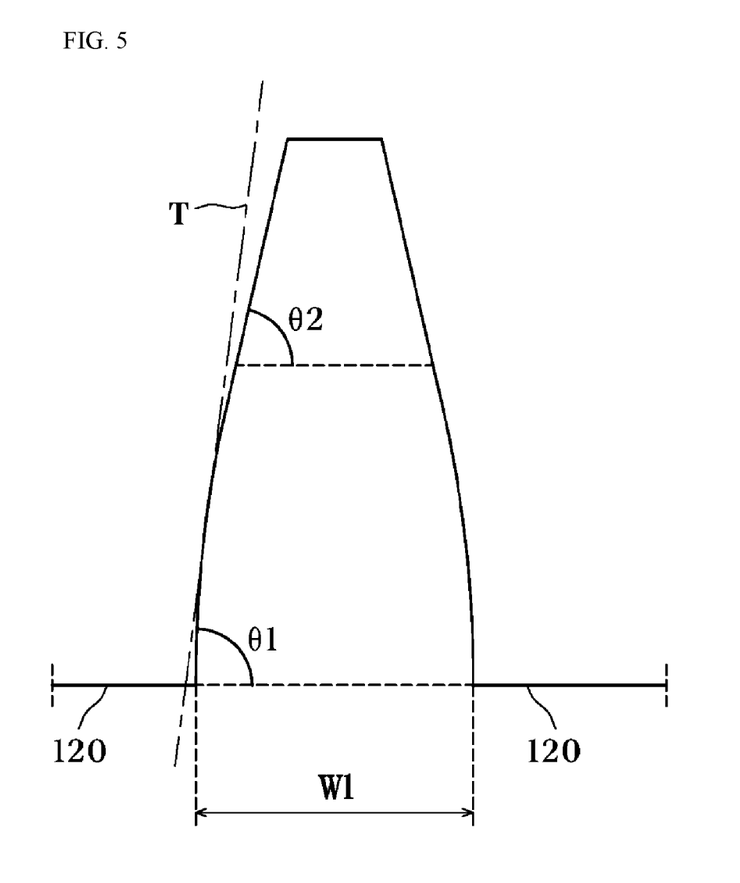
FIG. 5 is a conceptual view of a base angle (θ1) in the present invention in FIG. 4.

Referring to FIG. 5, the base angle θ1 of the curved first facet 141 is defined as an angle between a tangential line T at the most convex portion on a curved surface of the base angle and an extension line of the maximum width W1 of the engraved pattern 140. Alternatively, the second facet 142 of the engraved pattern may be a curved surface and the base angle θ2 of the curved second facet may be defined as in the first facet in FIG. 5.

Referring to FIG. 6, a polarizing plate according to yet another embodiment of the present invention will be described.

Referring to FIG. 6, the polarizing plate includes a polarizer 400, a first resin layer 100" having an engraved pattern 150 thereon, a second resin layer 200", and a protective layer 500. The polarizing plate according to this embodiment is substantially the same as the polarizing plate shown in FIG. 3 except for the engraved pattern 150 instead of the engraved pattern 110. A separation surface 120 is formed between the engraved patterns 150.

The engraved pattern 150 is constituted by a third facet 155 formed at the top portion thereof and a lateral side connected to the third facet 155. The engraved pattern 150 is substantially the same as the engraved pattern 130 of FIG. 3 except that the engraved pattern 150 is formed with a first facet 151 and a second facet 152 having different base angles (θ1, θ2) with respect to the maximum width of the engraved pattern 150 and consecutive to each other on the lateral side thereof.

Figure 7:
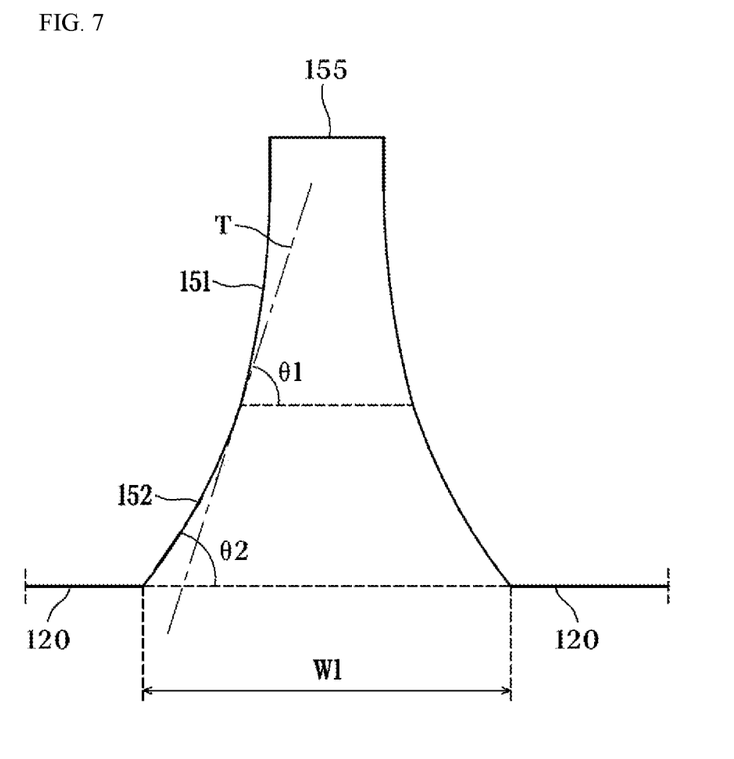
FIG. 7 is a conceptual view of base angles (θ1, θ2) in FIG. 6.

Referring to FIG. 7, the base angle θ1 of the curved first facet 151 is defined as the smallest angle among angles between a tangential line T on the first facet 151 and the second facet 152 and an extension line of the maximum width W1 of the engraved pattern 150, in which the angles satisfy Equation 2. The base angle θ2 of the second facet 152 is defined as an angle between the second facet 152 and the extension line of the maximum width W1 of the engraved pattern 150.

Preferably, the base angle θ1 of the first facet 151 ranges from about 70° to about 85°, more preferably from about 70° to about 80°. Within this range, the engraved pattern can assist in improvement in contrast ratio and viewing angle and can be easily formed. Preferably, the base angle θ2 of the second facet 152 ranges from about 60° to about 80°, or from about 70° to about 80°. Within this range, the engraved pattern can assist in improvement in contrast ratio and viewing angle, and can be easily formed. In the engraved pattern, θ1-θ2 may be greater than about 0° but not more than about 20°, specifically about 5° to about 15°. Within this range, the engraved pattern can improve the lateral contrast ratio.

A polarizing plate according to yet another embodiment may be substantially the same as the polarizing plate according to the above embodiments except that the first resin layer has a lower index of refraction than the second resin layer.

Here, an absolute value of a difference in index of refraction between the first resin layer and the second resin layer is about 0.3 or less, specifically about 0.2 or less, greater than about 0 but not more than about 0.2, more preferably about 0.05 to about 0.2. Within this range, the polarizing plate can achieve further improvement in contrast ratio and viewing angle. The first resin layer may have an index of refraction of about 1.55 or less, specifically about 1.4 to about 1.55, more specifically about 1.42 to about 1.52. Within this range, the first resin layer can easily realize the effects of the present invention. The second resin layer may have an index of refraction of about 1.55 or more, specifically about 1.58 to about 1.70, more specifically about 1.60 to about 1.68. Within this range, the second resin layer can secure a good light spreading effect while improving the contrast ratio.

A polarizing plate according to yet another embodiment may be substantially the same as the polarizing plate according to the above embodiment except that the engraved pattern is consecutively formed without the separation surface.

An optical display apparatus according to the present invention may include the polarizing plates according to the present invention. For example, the optical display apparatus may include a liquid crystal display and the like. The polarizing plate according to the present invention may be disposed as a viewer-side polarizing plate.

MODE FOR INVENTION

Next, the present invention will be described in more detail with reference to examples. However, it should be noted that these examples are provided for illustration only and should not be construed in any way as limiting the invention.

Example 1

A coating layer was formed on one surface of a PET film (Thickness: 80 μm, Re=14,000 nm at 550 nm, Toyobo Co., Ltd.) acting as a protective layer by coating a UV curable resin (SSC-SP4620M8, Shina T & C) thereon. From a film having a pattern portion comprising an engraved pattern and a separation surface alternately arranged thereon, the engraved pattern and the separation surface were transferred to the coating layer and cured to form a first resin layer (index of refraction: 1.50), on which the engraved pattern and the separation surface (width: 10 μm) having shapes of FIG. 2 and specifications of Table 1 were formed. A UV curable resin (SSC-6000M4, Shina T & C) was coated on the first resin layer to form a laminate of the protective layer and a pattern layer having a shape, as shown in FIG. 1, in which a second resin layer (index of refraction: 1.62) having a filling portion completely filling the engraved pattern was formed on the first resin layer.

A polarizer was manufactured by stretching a polyvinyl alcohol film to 3 times an initial length thereof at 60° C. and dyeing the stretched film with iodine, followed by stretching the dyed film to 2.5 times in an aqueous boric acid solution at 40° C.

A bonding agent (Z-200, Nippon Goshei Co., Ltd.) for polarizing plates was deposited to a lower surface of the polarizer and a COP film (Zeon Co., Ltd.) was bonded thereto. A polarizing plate was manufactured by bonding the second resin layer of the laminate to an upper surface of the polarizer.

Examples 2 to 4

Each of polarizing plates was manufactured in the same manner as in Example 1 except that the shape of the engraved pattern was changed as listed in Table 1.

Example 5

A polarizing plate was manufactured in the same manner as in Example 1 except that a first resin layer (index of refraction: 1.62) was formed of a UV-curable resin (SSC-6000M4, Shina T & C) and a second resin layer (index of refraction: 1.50) was formed of a UV-curable resin (SSC-SP4620M8, Shina T & C).

Examples 6 to 9

Each of polarizing plates was manufactured in the same manner as in Example 5 except that the shape of the engraved pattern was changed as listed in Table 1.

Comparative Example 1

A polarizing plate having a PET film as a protective layer, a polarizer, and a COP film sequentially stacked thereon was manufactured in the same manner as in Example 1 except that the pattern layer was not formed.

Comparative Examples 2 to 7

Each of polarizing plates was manufactured in the same manner as in Example 1 except that the shape of the engraved pattern was changed as listed in Table 2.

Each of the polarizing plates manufactured in Examples and Comparative Examples was evaluated as to the following properties shown in Tables 1 and 2.

<Manufacture of Light Source-Side Polarizing Plate>

A polarizer was manufactured by stretching a polyvinyl alcohol film to 3 times an initial length thereof at 60° C. and dyeing the stretched film with iodine, followed by stretching the dyed film to 2.5 times in an aqueous boric acid solution at 40° C. A polarizing plate was manufactured by bonding triacetylcellulose films (thickness: 80 μm) to both surfaces of the polarizer using a bonding agent for polarizing plates (Z-200, Nippon Goshei Co., Ltd.).

<Manufacture of Liquid Crystal Display Module>

A liquid crystal display module was manufactured by sequentially assembling a light source-side polarizing plate, a liquid crystal panel (PVA mode), and each of the polarizing plates manufactured in Examples and Comparative Examples. The pattern layer and the protective layer were disposed on a light exit surface of the polarizer.

(1) L value: Front brightness in the spherical coordinate system (0°, 0°) was obtained by measuring brightness in a white mode using an EZCONTRAST X88RC (EZXL-176R-F422A4, ELDIM Co., Ltd.).

(2) Ratio of lateral brightness (at 30° or 60°) to front brightness: A liquid crystal display (having the same configuration as Samsung LED TV (UN32H5500) including a one-side edge type LED light source except for the liquid crystal display modules of Examples and Comparative Examples) was manufactured by assembling an LED light source, a light guide plate, and the liquid crystal display module. Front brightness (0°, 0°), a lateral side (0°, 30°) and a lateral side (0°, 60°) in the spherical coordinate system were measured in a white mode using an EZCONTRAST X88RC (EZXL-176R-F422A4, ELDIM Co., Ltd.). A ratio of lateral brightness to front brightness was calculated.

(3) Lateral contrast ratio: A module was manufactured in the same manner as in (2). Lateral brightness (0°, 60°) was measured in a white mode and in a black mode. Lateral contrast ratio was calculated based on the ratio of brightness in a white mode to brightness in a black mode. At a lateral contrast ratio of 280 or more, improvement in lateral contrast ration could be confirmed in application of a polarizing plate to an optical display apparatus.

TABLE 1

| | Example | | | | | | | | |
|---|---|---|---|---|---|---|---|---|---|
| | 1 | 2 | 3 | 4 | 5 | 6 | 7 | 8 | 9 |
| Engraved pattern | FIG. 2 | FIG. 3 | FIG. 4 | FIG. 6 | FIG. 2 | FIG. 3 | FIG. 4 | FIG. 6 | FIG. 6 |
| $\theta 2$ (°) | 70 | 70 | 70 | 70 | 70 | 70 | 70 | 70 | 70 |
| $\theta 1$ (°) | 80 | 80 | 80 | 80 | 80 | 80 | 80 | 80 | 80 |
| h1 (μm) | 14 | 16 | 14 | 16 | 14 | 16 | 14 | 16 | 16 |
| h2 (μm) | 6 | 4 | 6 | 4 | 6 | 4 | 6 | 4 | 4 |
| Relation 2 | 0.7 | 0.8 | 0.7 | 0.8 | 0.7 | 0.8 | 0.7 | 0.8 | 0.8 |
| W1 (μm) | 12 | 10 | 12 | 10 | 12 | 10 | 12 | 10 | 12 |
| W2 (μm) | 7.1 | 7.1 | 7.1 | 7.1 | 7.1 | 7.1 | 7.1 | 7.1 | 9.1 |
| Aspect ratio of engraved pattern | 1.67 | 2.00 | 1.67 | 2.00 | 1.67 | 2.00 | 1.67 | 2.00 | 1.67 |
| Refractive index of first resin layer | 1.50 | 1.50 | 1.50 | 1.50 | 1.62 | 1.62 | 1.62 | 1.62 | 1.62 |
| Refractive index of second resin layer | 1.62 | 1.62 | 1.62 | 1.62 | 1.50 | 1.50 | 1.50 | 1.50 | 1.50 |
| L (cd/m$^2$) | 458.6 | 451.6 | 457.9 | 470.1 | 460.5 | 465.7 | 461.3 | 474.9 | 475.3 |
| Ratio of brightness at 30° to brightness at front side (%) | 55 | 59 | 55 | 63 | 54 | 57 | 54 | 59 | 60 |
| Ratio of brightness at 60° to brightness at front side (%) | 26 | 29 | 27 | 28 | 26 | 27 | 26 | 26 | 27 |
| Lateral contrast ratio (60°) | 294 | 304 | 296 | 298 | 292 | 296 | 293 | 289 | 291 |

TABLE 2

| | Comparative Example | | | | | | |
|---|---|---|---|---|---|---|---|
| | 1 | 2 | 3 | 4 | 5 | 6 | 7 |
| Engraved pattern | — | Trapezoidal shape | FIG. 2 | FIG. 3 | FIG. 2 | FIG. 6 | FIG. 6 |
| $\theta 2$ (°) | — | — | 70 | 70 | 60 | 70 | 60 |
| $\theta 1$ (°) | — | — | 80 | 80 | 65 | 80 | 65 |
| h1 (μm) | — | — | 9 | 9 | 16 | 9 | 16 |
| h2 (μm) | — | — | 11 | 11 | 4 | 11 | 4 |
| Relation 2 | — | — | 0.45 | 0.45 | 0.8 | 0.45 | 0.8 |
| W1 (μm) | — | — | 12 | 12 | 12 | 12 | 12 |
| W2 (μm) | — | 10 | 8.8 | 4 | 6.4 | 4 | 6.4 |
| Aspect ratio of engraved pattern | — | 1.67 | 1.67 | 1.67 | 1.67 | 1.67 | 1.67 |
| Refractive index of first resin layer | — | 1.50 | 1.50 | 1.50 | 1.50 | 1.62 | 1.62 |
| Refractive index of second resin layer | — | 1.62 | 1.62 | 1.62 | 1.62 | 1.50 | 1.50 |
| L (cd/m$^2$) | 510 | 470.8 | 458.1 | 436.7 | 440.4 | 436.1 | 445.8 |
| Ratio of brightness at 30° to brightness at front side (%) | 53 | 55 | 54 | 55 | 60 | 54 | 59 |
| Ratio of brightness at 60° to brightness at front side (%) | 14 | 19 | 24 | 29 | 20 | 30 | 19 |
| Lateral contrast ratio (60°) | 190 | 208 | 234 | 242 | 254 | 248 | 249 |

As shown in Table 1, the polarizing plates according to the present invention can remarkably improve brightness and contrast ratio. The polarizing plates according to the present invention could increase the ratio of brightness at 30° to brightness at the front side (%) and the ratio of brightness at 60° to brightness at the front side (%), with the lateral contrast ratio remarkably increased.

On the contrary, as shown in Table 2, the polarizing plates of Comparative Examples failing to satisfy the pattern layer according to the present invention could not achieve the advantageous effects of the present invention.

Although some embodiments have been described herein, it should be understood that various modifications, changes, alterations, and equivalent embodiments can be made by those skilled in the art without departing from the spirit and scope of the present invention.

The invention claimed is:

1. A polarizing plate comprising:
   a polarizer; and
   a pattern layer disposed on an upper surface of the polarizer,
   wherein the pattern layer comprises a first resin layer, the first resin layer being formed on a lower surface thereof with at least one engraved pattern having a lateral side, the lateral side having a first facet and a second facet consecutive to the first facet, the first facet and the second facet having different base angles with respect to a maximum width of the engraved pattern and satisfying Relations 1 and 2:

$$\theta 1 > \theta 2, \quad \text{[Relation 1]}$$

wherein Relation 1, θ1 denotes a base angle of the first facet, θ2 denotes a base angle of the second facet, about 70°≤θ1≤about 90°, about 0°<θ2<about 90°; and $$\text{about } 0.5 \leq h1/(h1+h2) < \text{about } 1.0, \quad \text{[Relation 2]}$$

wherein Relation 2, h1 denotes a projection height of the first facet projected on a maximum height of the engraved pattern and h2 denotes a projection height of the second facet projected on the maximum height of the engraved pattern.

2. The polarizing plate according to claim 1, wherein the engraved pattern has an aspect ratio of greater than about 1.0.

3. The polarizing plate according to claim 1, wherein the engraved pattern has a (θ1−θ2) value of greater than about 0° but not more than about 20°.

4. The polarizing plate according to claim 1, wherein h1/(h1+h2) ranges from about 0.5 to about 0.9.

5. The polarizing plate according to claim 1, wherein the engraved pattern comprises a third facet formed at a top portion thereof and the lateral side connected to the third facet, and the third facet is a flat surface.

6. The polarizing plate according to claim 5, wherein the first facet is closer to a separation surface or the third facet than the second facet.

7. The polarizing plate according to claim 1, wherein the lateral side is free from facets having the same base angle.

8. The polarizing plate according to claim 1, wherein each of the first facet and the second facet is a flat surface or a curved surface.

9. The polarizing plate according to claim 1, wherein a maximum width of a first region of the engraved pattern having the first facets at both lateral sides thereof is about 1.1 times to about 3 times a maximum width of a second region of the engraved pattern having the second facets at both lateral sides thereof.

10. The polarizing plate according to claim 1, wherein the engraved pattern has a longitudinal direction tilted at an angle of about −20° to about +20° with respect to an absorption axis of the polarizer.

11. The polarizing plate according to claim 1, wherein the pattern layer further comprises a filling portion partially filling at least part of the engraved pattern or a second resin layer having the filling portion formed thereon.

12. The polarizing plate according to claim 11, wherein the first resin layer has a smaller index of refraction than the filling portion or the second resin layer.

13. The polarizing plate according to claim 11, wherein the first resin layer has a higher index of refraction than the filling portion or the second resin layer.

14. The polarizing plate according to claim 11, wherein an absolute value of a difference in index of refraction between the second resin layer or the filling portion and the first resin layer is about 0.3 or less.

15. The polarizing plate according to claim 11, wherein the second resin layer is an adhesive layer.

16. The polarizing plate according to claim 5, wherein a minimum distance between the third face and an upper surface of the first resin layer ranges from about 0 μm to about 10 μm.

17. The polarizing plate according to claim 1, wherein the first resin layer further comprises a separation surface between adjacent engraved patterns.

18. The polarizing plate according to claim 1, further comprising: a protective layer formed on an upper surface of the first resin layer.

19. The polarizing plate according to claim 1, wherein the engraved pattern is composed of the first facet adjoining a separation surface on the lower surface of the first resin layer, the second facet consecutive to the first facet, and a third facet formed at the top portion thereof to be consecutive to the second facet.

20. The polarizing plate according to claim 1, wherein the engraved pattern is composed of the second facet adjoining a separation surface on the lower surface of the first resin layer, the first facet consecutive to the second facet, and a third facet formed at the top portion thereof to be consecutive to the first facet.

21. An optical display apparatus comprising the polarizing plate according to claim 1.

* * * * *